Feb. 20, 1968  P. M. CRUSE ET AL  3,370,285
DETECTION SYSTEM
Filed April 6, 1966
4 Sheets-Sheet 1
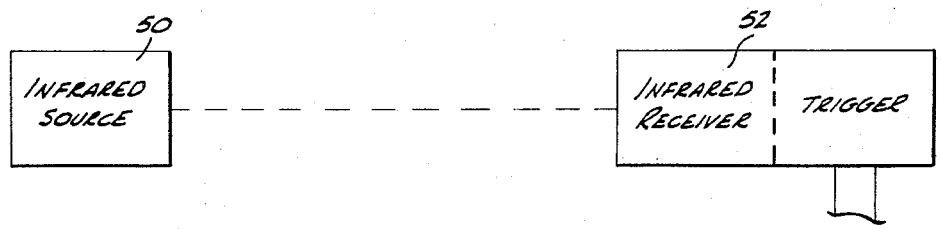
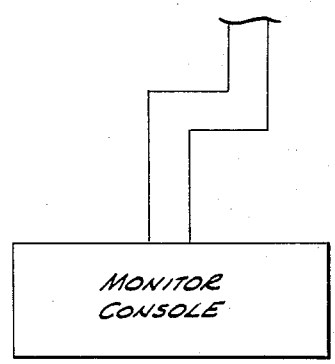
FIG. 2.
FIG. 1.
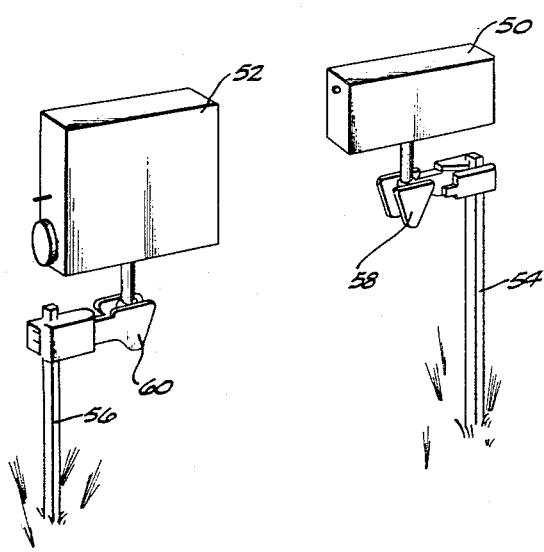
INVENTORS.
PHILIP M. CRUSE,
NORMAN B. STEVENS,
ROBERT M. TALLEY,
BY
ATTORNEY.

United States Patent Office
3,370,285
Patented Feb. 20, 1968

3,370,285
DETECTION SYSTEM
Philip M. Cruse, Norman B. Stevens, and Robert M. Talley, Santa Barbara, Calif., assignors to Santa Barbara Research Center, Goleta, Calif., a corporation of California
Filed Apr. 6, 1966, Ser. No. 540,733
10 Claims. (Cl. 340—258)

ABSTRACT OF THE DISCLOSURE

The detection system disclosed employs a solid state infrared radiation emitter. Specifically, a power supply drives an appropriate oscillator capacitor via an appropriate gate to pulse the solid state emitter in a determined time pattern and with a determined intensity. A receiver is positioned in optical alignment and spaced relation to the transmitter and comprises a solid state detector, broad band pulse amplifier, a first gate, a sawtooth generator, a second gate and a trigger. An appropriate power supply is provided for the receiver. The transmitter pulses radiation in a narrow invisible spectral band with pulses of high broad band frequency and intensity. The receiver upon continued reception of the pulses operates in a first mode to periodically discharge the sawtooth generator to prevent transmission of a signal from the generator through the second gate to the trigger. Upon lack of reception of a determined number of pulses in the receiver the sawtooth generator is allowed to charge to a voltage level exceeding level or threshold of the gate downstream thereof. The downstream gate opens and energizes the trigger which in turn initiates an alarm indicating intrusion, that is, interruption of the invisible beam between the transmitter and receiver.

---

The invention is directed to a novel detection system and has particular utility in determining the unwanted intrusion of personnel to a given restricted area. The arrangement is readily adaptable to both permanent or temporary installation, the latter being typically encountered in field areas during military operations.

The disclosed invention incorporates a versatile, efficient and economical system which utilizes infrared and electronic technology to provide a simplified yet effective mode of alarm or notice with reference to unwanted intrusion into a predetermined area. Basically, the system consists of an infrared source and an independent infrared receiver both of which may be appropriately positioned and aligned in spaced relation to each other. An alarm output signal is generated when the infrared beam is interrupted by a passing object. In addition to providing an alarm signal reflecting the fact of beam interruption, the arrangement has further utility in that, with proper interpretation, intelligence may be communicated to a central monitor as to the general type of interruption. This intelligence is reflected by interpreting the length of interruption in relation to time.

In addition to providing a detection system having the features of simplicity, economy and easy installation, the invention has as a further object a system which may effectively operate under a wide variety of climatic conditions including daylight, darkness and during periods of rain, fog, sandstorms and the like without impairing the sensitivity of the system.

As a further feature, it will appear that the invention is readily adaptable to temporary field installations in that it is small, readily portable and may be adapted to a battery power source which provides long life time and reliable operation.

Specifically, the arrangement operates on an extremely low effective power level in that a relatively high energy pulse is created in a narrow spectral band, the pulse, per se, being extremely short in point of time with a comparatively long elapsed time between pulses. This relatively low effective power consumption assures extended time operation even under temporary field conditions. It should be noted that the actual embodiment of the invention may utilize solid-state electronic components without the mechanical devices utilized in prior art detection systems and therefore provides a high degree of reliability in operation.

The system is also adaptable to easy and rapid field installation. Alignment between the infrared source and receiver may be easily accomplished during daylight hours by visual sighting along the edges of the encapsulating packages. Night installation is further easily achieved by employing a small light source such as a pocket flashlight in front of both the transmitting and receiving device. The field of view or width of transmitter beam transmission relative to the receiver is also easily determined and thus accuracy in installation alignment assured.

The arrangement has a further advantage in that it is readily adaptable to miniaturization and therefore may be easily camouflaged in field installations.

Easy camouflage and the fact that the beam or wave produced is in the eye-invisible near-infrared region reduces to a minimum the possibility of unwanted system discovery. Futher, discovery of the system using infrared sensors is difficult without beam interruption and consequent alarm. The arrangement has a further advantage in that it is readily adaptable to multi-sensor systems which, in addition to noting the fact of intrusion, can be arranged to identify specific areas of intrusion.

These and other features and advantages of the invention will become apparent in the course of the following description and from an examination of the related drawings, wherein:

FIGURE 1 is a side elevational view of encapsulated transmitter and receiver suitable for field installation;

FIG. 2 is a schematic diagram of the basic system;

Figure 6:
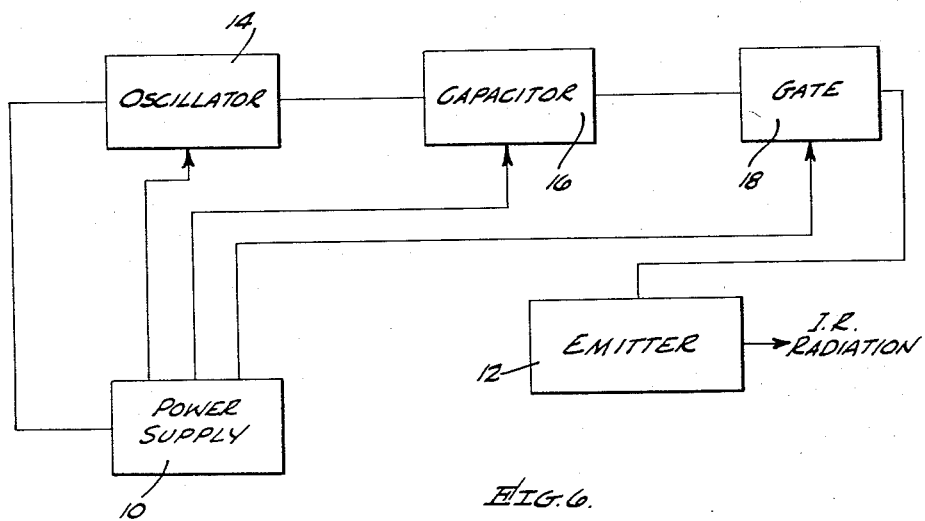
FIG. 6 is a schematic block diagram illustrating the construction and operation of a typical transmitter employed in the invention.

FIG. 6 is a block diagram indicating typical operational circuits for producing a high energy infrared pulse wave in a relatively narrow spectral band. The arrangement is provided with a battery power source 10 and a solid state crystal emitter diode 12, the diode providing a source of electromagnetic radiation of either coherent or noncoherent character. For example, a gallium arsenide diode has been found satisfactory to produce an appropriate noncoherent or coherent electromagnetic infrared wave pulse.

Figure 7:
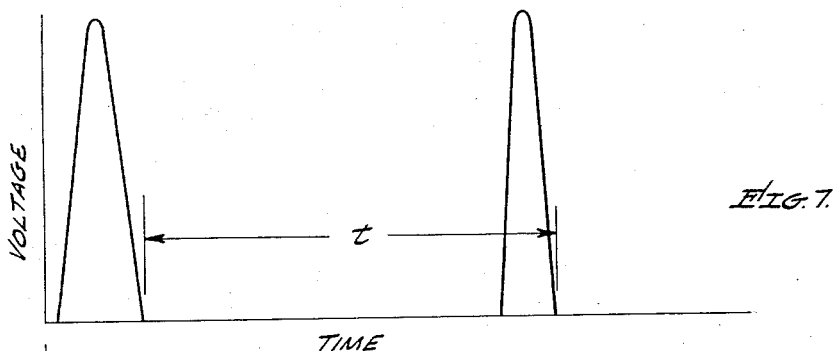
FIG. 7 is a graph showing typical modulating voltage of the transmitted IR pulse and illustrating the relative time duration of the pulses and elapsed time between pulses.

The transmitter circuit of FIG. 6 is additionally provided with an oscillator 14 in series relation with a capacitor 16, the latter being sequentially charged by action of the oscillator. A conventional threshold or gate switch 18 is connected in series between the capacitor and the emitter 12 and provides a mode to accommodate and control capacitor discharge to the emitter in a determined sequence and voltage level. Thus a high energy pulse of infrared radiation in a narrow spectral band is transmitted in determined time sequence. A particular feature of the disclosed arrangement is that the energy pulse, although of a high level, is extremely short in point of time with a relatively long elapsed time between pulses. Thus, although a high energy pulse is emitted, the average power consumption per unit of time is extremely low. This affords efficient use of the electrical power from battery 10 and, accordingly, relatively long time operation even under temporary field installation conditions. It will also be noted that efficient power consumption is provided even in permanent installations having a permanent power source. The graph of FIG. 7 is illustrative of typical wave pulses showing both voltage level and pulse duration as well as the time interval between pulses.

Figure 5:
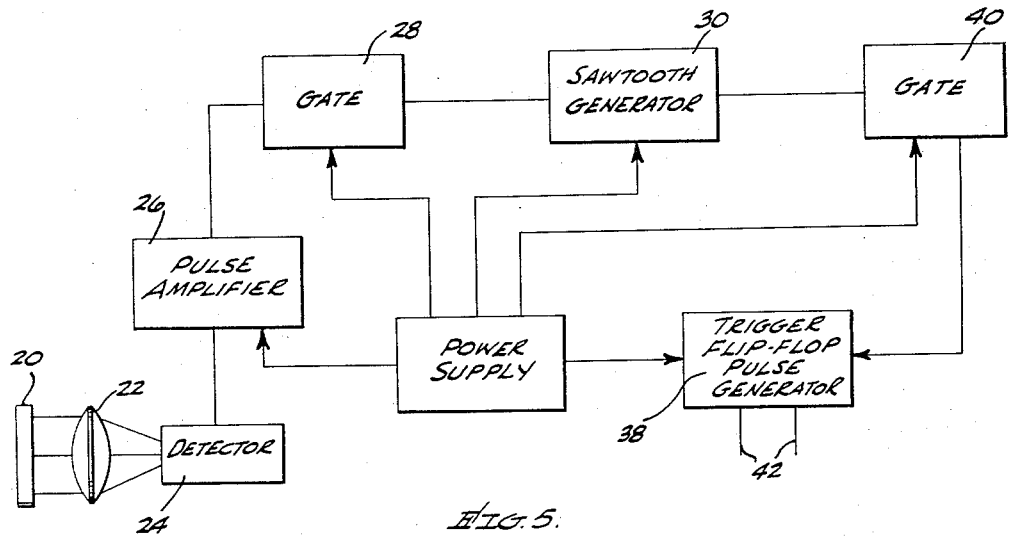
FIG. 5 is a schematic block diagram illustrating the construction and operation of a typical receiver employed in the invention.

The block diagram of FIG. 5 is illustrative of a typical receiving circuit which may be utilized to pick up the infrared wave transmission and provide a mode of signal recognition whenever the transmitted wave has been interrupted by an intruding person or other object. The operation of the receiver and its ability to recognize unauthorized intrusion is based upon the fact that no alarm is given upon continuous reception both from an intensity and time standpoint of the controlled wave pulses emitted by the transmitter. As will hereinafter be explained, it is the interruption of reception of the emitted wave pulses that serves as a mode of intrusion recognition. In a preferred embodiment of the receiver a filter 20 is provided which is in optical series with a focusing lens 22, the latter being operative to focus received energy pulses on an appropriate infrared detector 24. A typical detector 24 that may be employed is known in the art as a silicon photodiode although it is understood that other detectors may be adapted to the invention.

Figure 8:
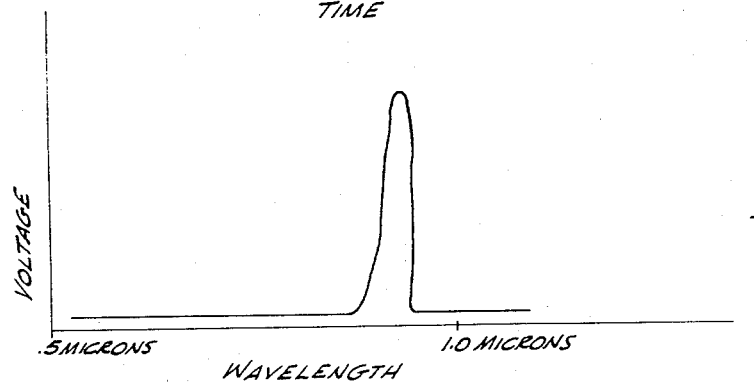
FIG. 8 is a graph showing typical radiated infrared energy of the transmitted pulse versus the wavelength thereof in microns.

Considering FIG. 8, it will be seen that a preferred embodiment of the invention may utilize an infrared wave pulse of narrow spectral band and as shown is approximately 0.9 micron region. However, other spectral regions, invisible to the human eye, may be used such as ultraviolet, radio frequencies and the like. The filter 20 is designed to accommodate wave transmission only within the narrow spectral band of the emitted pulses. Thus, the filter is effective to eliminate much background energy from any source, such as the sun energy, substantially limiting the detector 24 response to the transmitter emitted pulses. Of course, perfect limitation is extremely difficult.

Figure 9:
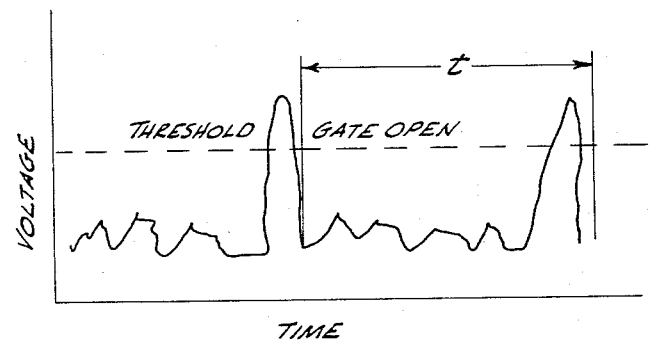
FIG. 9 is a graph illustrating the detected pulse level at the output of the pulse amplifier in the receiver and the mode of discrimination to assure reliable operation.

A pulse amplifier 26 is in series with detector 24 and receives and amplifies the signals from the detector. Technical persons familiar with detector operation will be aware of the fact that in normal circumstances a certain amount of random or background noise of relatively minor intensity characterizes the typical operation of a detector 24. In order to avoid erroneous signal interpretation, a threshold or gate switch 28 is provided in series with the pulse amplifier. The gate 28 prevents signal transmission due to the relatively low intensity background noise. However, upon the reception of an energy pulse from the transmitter the gate 28 opens and discharges the signal to a sawtooth generator 30 in operative series therewith. A graphic representation of the energy pulses and background noise at the output of the pulse amplifier 26 is shown in FIG. 9. The threshold or gate 28, of course, will only discharge in response to the relatively high level energy pulses from the transmitter as is evidenced by the two large pulses shown. Characteristically, all background noise is below the threshold gate switch open level. Thus, the reliability of the system is enhanced. It is noted that the time $t$ is of identical duration both for transmitter of FIG. 7 and receiver of FIG. 9.

Figure 10:
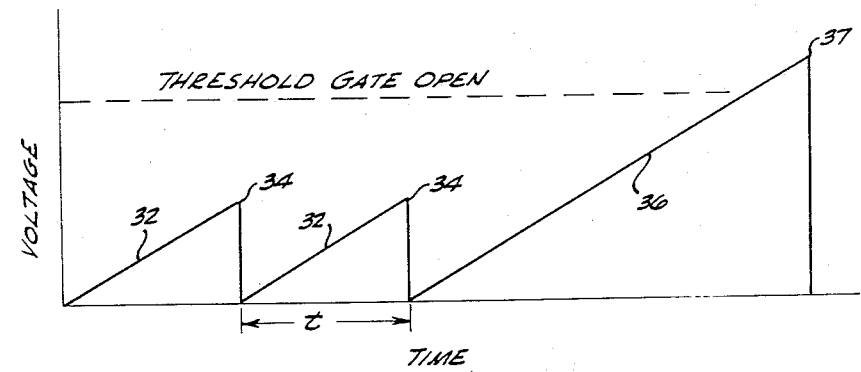
FIG. 10 is a graph illustrating voltage output receiver generator reflecting both normal operation and intrusion detection.

A sawtooth generator 30 normally has a continuous output as shown by the graph of FIG. 10. It will be seen that the generator normally continuously charges as indicated by lines 32, 32 to peaks at 34 which represent the point of reception of a transmitted energy pulse from the gate 28, namely at time interval $t$. This pulse received from gate 28 induces discharge of the generator to a neutral level whereupon generation of charge is again begun.

A signal output device or trigger 38 which, in the preferred embodiment of the invention, is a flip-flop pulse generator, is in electrical series with the sawtooth generator with another threshold or gate switch 40 interposed therebetween. The gate 40 is designed to transmit a signal to the pulse generator 38 when the sawtooth generator charges to a voltage level above the transmission point of the gate 40. This is illustrated in FIG. 10 by charge line 36 to peak point 37 above gate open level. Normally, excessive charging of generator 30 is prevented by discharge thereof by pulse received from gate 28 resulting from the time $t$ reception of infrared pulses from the transmitter of FIG. 6. Gate 40 remains closed. Upon interruption of the infrared pulses as a result of beam interruption by an intruded certain time $t$ pulses are no longer present and the generator 30 charges to the gate open level as at 36. Gate 40 opens and trigger 38 is energized. The leads 42, 42 may carry the signal from trigger 38 to any conventional monitoring device spaced any appropriate distance from the intrusion system.

To summarize, it will be apparent that the transmitter of FIG. 6 continuously emits in an appropriate time sequence an infrared radiation pulse and the receiver of FIG. 5 is actuated by the continuous timed reception of the transmitted pulses which in turn prevents alarm actuation. Upon omission of one or more pulses, the receiver of FIG. 5 recognizes the omission or interruption and an output is created at the pulse generator 38. Patently, the transmission of the infrared pulses will be interrupted upon the passage of a person or other article through the infrared beam. The output from the pulse generator 38 which provides the alarm signal will have a time duration directly related to the time of interruption of the infrared beam. Thus, an observer or monitor of the pulse generator output signal is given some intelligence as to the type of beam interruption. For example, a passage of a single individual will cause a relatively short interruption in the beam while a series of individuals will create periodic beam interruption and periodic output signals. Similarly, the passage of vehicles or other large objects will project output signals of relatively long duration.

FIG. 1 presents a side elevational view of the embodied and encapsulated transmitter and receiver of FIGS. 5 and 6 suitable for temporary field installation. The transmitter is indicated by numeral 50 and the receiver by numeral 52. Supporting posts 54 and 56 are provided and have, at their upper extremities, clamps 58 and 60 which mount the transmitter and receiver respectively. The posts 54 and 56 are suitable for implanting the terrain. It is noted that the units as disclosed are relatively small and easily camouflaged and that discovery thereof is consequently difficult.

FIG. 2 illustrates a simplified block diagram of a typical detection system. An infrared transmitter 50 may be physically placed at one location and the receiver 52 at a second location such as on opposed sides of a road or country trail. With appropriate equipment it is possible to space the transmitter and receiver distances of 1000 feet or more. To set up a transmitter and receiver it is only necessary that the operator sight along the edge of the transmitter and receiver packages to properly align same. It will be apparent that the arrangement could be easily installed at remote field locations.

Figure 3:
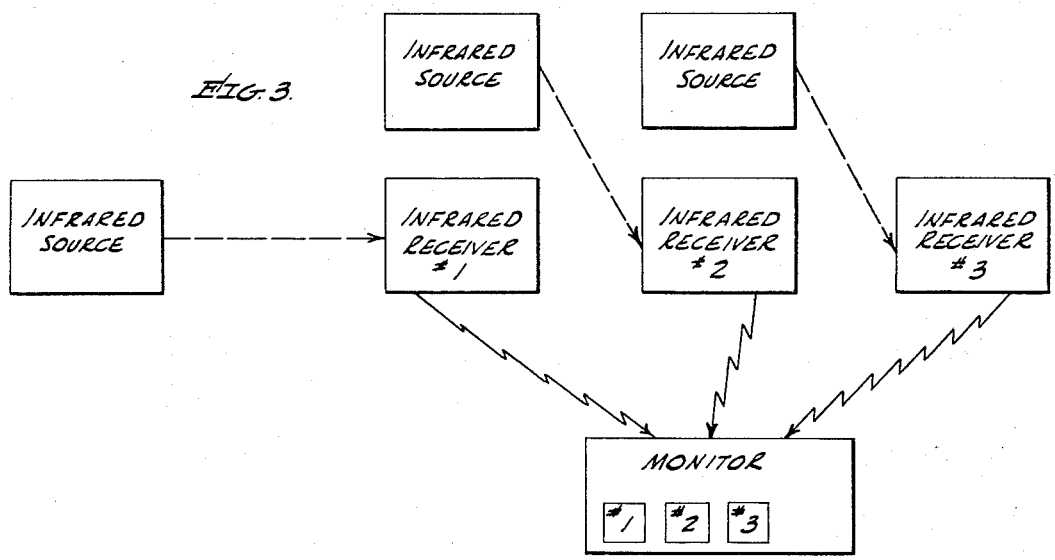
FIG. 3 is a schematic diagram of a multi-sensor centrally monitored system.

FIG. 3 illustrates cascading several systems and providing a central monitor for the cascaded systems. A single point alarm center could be created which could be adapted to detect intrusion around a rather extensive area such as might be required in a countryside, military installation, such as an airfield, or other encampment.

Figure 4:
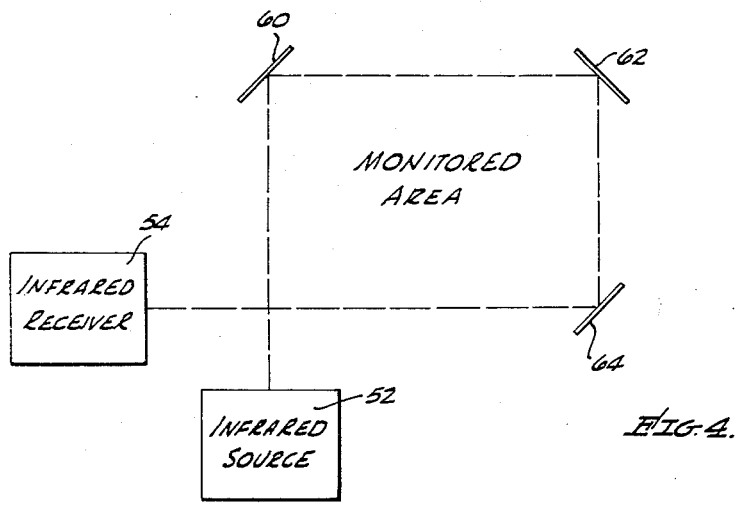
FIG. 4 is a schematic diagram of a detector arrangement employing a multiplicity of mirrors which defines the monitored area.

FIG. 4 illustrates a mode of utilizing a single transmitter and receiver to provide for intrusion detection in a given enclosed area. The result is achieved by appropriate infrared reflecting mirrors 60, 62 and 64.

Briefly reviewing the invention disclosed, it will be apparent that the feature of utilizing a narrow time-width radiation pulse in a narrow spectral region provides the advantages of power source conservation and efficiency and also provides peak power output for long system ranges without structural heating problems. The fact of avoidance of excessive heating also contributes to the miniaturization of system components.

Receiver sensitivity and accuracy of a high degree is provided due to narrow spectral band optical filtering which eliminates any effect from broad-band transient radiation sources, such as lights which not only increase system discrimination but also increases the effective range thereof with a given power source. Additionally, the fact the receiver and alarm respond only to short-time high-intensity infrared pulses provides additional discrimination against background radiation sources with resulting increased reliability.

It will thus be apparent that the invention disclosed provides a versatile, efficient and economical system for effectively policing a specific locale or area. In addition to simplicity, the system is adaptable to desirable miniaturization which makes for ease of transport, setup, and camouflage. By employing wave transmission in the infrared spectrum, the arrangement is extremely difficult to detect. Further, the system approaches 100% failproof in that the failure of virtually any component in the system will induce a continuous output signal and thus notify a monitor of possible malfunction.

The invention as disclosed is by way of illustration and may be modified in many respects all within the scope of the appended claims.

What is claimed is:
1. In an entry detection system,
a source operative to transmit a time-pulsed wave in an invisible spectral region,
a receiver adapted to internally create a sequential energy pulse and to receive the time-pulsed wave transmitted by the source,
the approximate level of said energy pulse being controlled by the received wave in a first operating mode of the receiver,
said source and receiver being in spaced relation to each other so that the wave is transmitted through the area therebetween,
and indicating means operatively associated with the receiver,
said created energy pulse in said receiver being adapted to activate said indicating means in a second operating mode of the receiver in response to a determined interruption of said wave by entry of an object into said area and interruption of a determined sequence reception of the time-pulsed wave at the receiver whereby the level of said energy pulse varies beyond a determined limit.

2. An entry detection system according to claim 1, wherein the internally created energy pulse varies in charge level with time,
the activation of said indicating means being initiated by a variation of the charge level of said created energy pulse beyond said determined limit between the first operating mode and the second operating mode in response to said interruption of reception in time of the time-pulsed wave at the receiver.

3. An entry detection system according to claim 2, wherein said transmitted time-pulsed wave is of extremely short time duration relative to the elapsed time between each pulsed wave,
the elapsed time between transmission of the pulsed waves being of approximately equal predetermined time duration.

4. An entry detection system according to claim 3, wherein the created energy pulse in the receiver normally increases in charge level with time, the continued reception of said time-pulsed wave being operative to successively induce return of the varying charge level below the determined limit in said first operating mode,
the interruption of the determined sequence reception of said time-pulsed waves at the receiver accommodating the charging of the created energy pulse to a level exceeding said determined limit and thereby activating said indicating means in said second operating mode.

5. An entry detection system according to claim 4, said source is operative to transmit a time-pulsed wave in a narrow band of said invisible spectral region,
and filter means associated with a receiver adapted to transmit therethrough waves approximately within said narrow bend and to reject other waves outside said narrow band.

6. In a detection system,
a wave source operative to transmit a determined time-pulsed wave in a narrow band of the invisible spectral region,
a receiver spaced from the source and operative to receive the time-pulsed wave transmitted by said source,
the time length of the pulsed wave being extremely short in relation to the elapsed time between the pulses,
said receiver including means to provide a signal the charge level of which continually varies with time,
the reception of the time-pulsed wave at the receiver maintaining the signal charge level within determined limits,
indicating means associated with the receiver,
and means responsive to a variation in said charge level of the signal beyond said limits to induce energizing of said indicating means, the variation of said charge level of said signal being responsive to the lack of reception of a determined number of said pulsed waves at said receiver.

7. In an energy detection system,
a source operative to transmit a variable frequency time-pulsed wave in an invisible spectral region,
said pulsed waves having a generally uniform continuity pattern in relation to time,
a receiver,
indicating means operatively associated with the receiver,
said receiver including control means to control the energizing of said indicating means and adapted to operatively respond to the continued reception of the pulsed waves from said source in a first mode of operation that prevents energizing of said indicating means,
said control means being operative to respond to a lack of reception of a determined number of said pulsed waves in another mode of operation and thereby energize said indicating means,
the receiver control means including means providing an electrical charge of varying level with time,
the continued reception of said time-pulsed wave at the receiver being operative to sequentially return the charge to an approximate predetermined level and thereby inhibit energizing of the indicating means.

8. An entry detection system according to claim 7, wherein the means providing the electrical charge in the receiver internally creates said charge, the latter continually varying in level with time, and the continued reception of said time-pulsed waves sequentially limiting the degree of change of level of said charge within determined limits and within a determined elapsed time, the receiver control means being responsive to lack of reception of a determined number of said time-pulsed waves to permit the variation of said charge level beyond said determined limits whereby said indicating means are energized.

9. In an entry detection system,
a source operative to transmit a time-pulsed wave in a narrow spectral band of an invisible spectral region,
a receiver spaced from the source and adapted to receive the wave transmitted by the source and create a pulsed signal time responsive thereto,
each pulse of said wave being of short time duration relative to the elapsed time between transmitted pulses,
alarm means associated with the receiver for activation thereby,
said receiver including energizing means to activate said alarm means in response to a determined interruption of said wave by entry of an object into the area between the source and the receiver,
said energizing means including generating means to generate an electrical impulse characterized by an increase in intensity with time,
amplifying means to receive and amplify said pulsed signal to a determined level,
first threshold gate means to receive the amplified pulsed signal and accommodate transmission thereof to the generating means,
said first threshold gate means being operative to inhibit transmission of signals below said determined level,
said transmitted pulsed signal being operative to periodically discharge said electrical impulse created by the generating means,
second threshold gate means in electrical series with said generating means and said alarm means,
said second threshold gate means being operative to transmit to the alarm means any generated electrical impulse above another determined level and to inhibit transmission to the alarm means by any electrical impulse below said other determined level,
said alarm means being activated by the generation of an electrical impulse by the generating means above said other determined level,
said last-mentioned generation being responsive to the interruption of said pulsed signal to said generating means in turn responsive to the interruption of said wave by passage of an object through said area.

10. An entry detection system according to claim 9, wherein said source includes a solid state source of electromagnetic radiation,
said receiver including a photodetector to receive and respond to said radiation,
said receiver further including filter means adapted to transmit therethrough waves approximately within said narrow spectral band and to inhibit passage of waves outside thereof.

References Cited
UNITED STATES PATENTS

| | | | |
|---|---|---|---|
| 1,947,079 | 2/1934 | Ellis | 250—221 X |
| 2,227,147 | 12/1940 | Lindsay | 250—221 X |
| 3,191,048 | 6/1965 | Cowen | 340—228 X |

FOREIGN PATENTS 880,409 10/1961 Great Britain.

JOHN W. CALDWELL, *Primary Examiner.*

NEIL C. READ, *Examiner.*

D. L. TRAFTON, *Assistant Examiner.*